US006584090B1

(12) United States Patent
Abdelgany et al.

(10) Patent No.: US 6,584,090 B1
(45) Date of Patent: Jun. 24, 2003

(54) SYSTEM AND PROCESS FOR SHARED FUNCTIONAL BLOCK CDMA AND GSM COMMUNICATION TRANSCEIVERS

(75) Inventors: MohyEldeen Fouad Abdelgany, Irvine, CA (US); Dana Vincent Laub, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 09/298,315

(22) Filed: Apr. 23, 1999

(51) Int. Cl.[7] .............................................. H04B 7/216
(52) U.S. Cl. ...................... 370/342; 370/345; 370/347; 370/320; 455/82; 455/84; 455/552
(58) Field of Search .......................... 455/426, 74, 82, 455/83, 84, 86, 552, 553, 127, 93, 102, 118, 142; 370/342, 345, 347, 320; 375/216, 219

(56) References Cited

U.S. PATENT DOCUMENTS 5,722,053 A  2/1998  Kornfeld et al. ............... 455/86

(List continued on next page.)

FOREIGN PATENT DOCUMENTS

| EP | 95302359.5 | 10/1995 |
|----|-----------|---------|
| WO | WO 97/30523 | 8/1997 |
| WO | WO 00/11797 | 3/2000 |

OTHER PUBLICATIONS

Tetsu Sakata, Kazuhiko Seki, Shuji Kubota and Shuzo Kato, "π/4–shift QPSK Digital Modulator LSIC for Personal Communication Terminals", 5th IEEE International Symposium on Personal, Indoor and Mobile Radio communications (PIMRC'94), The Hague, The Netherlands, pp. 472–475, Sep. 18–22, 1994.

Primary Examiner—Edward F. Urban
Assistant Examiner—Khawar Iqbal
(74) Attorney, Agent, or Firm—Thomas, Kayden, Horstemeyer & Risley, L.L.P.

(57) ABSTRACT

A communication system for communicating CDMA and GSM transmit and receive RF information signals through one or more antennas is disclosed. The communication system is comprised of a transmitting unit, a receiving unit, and at least one antenna. The transmitting unit modulates and upconverts a transmit baseband information signal to generate a CDMA transmit RF information signal and a GSM transmit RF information signal. The receiving unit downconverts and demodulates a CDMA receive RF information signal and a GSM receive RF information signal to generate a receive baseband information signal. One or more antennas are coupled to the transmitting unit and receiving unit for transmitting the CDMA transmit RF information signal and the GSM transmit RF information signal, and receiving the CDMA receive RF information signal and the GSM receive RF information signal. The transmitting unit comprises a modulator for modulating a transmit IF LO frequency with the transmit baseband information signal to generate a transmit IF information signal. It also includes a plurality of upconverters for upconverting the transmit IF information signal with a GSM transmit RF LO frequency to generate a GSM transmit RF information signal, and for upconverting the transmit IF information signal with a CDMA transmit RF LO frequency to generate at least one CDMA transmit RF information signal. The receiving unit comprises a downconverter for downconverting a CDMA receive RF information signal with a receive RF LO frequency to generate a receive IF information signal, and for downconverting at least one GSM receive RF information signal with the receive RF LO frequency to generate a receive IF information signal. It also includes a demodulator for demodulating the receive IF information signal with a receive IF LO frequency to generate a receive baseband information signal.

17 Claims, 5 Drawing Sheets

U.S. PATENT DOCUMENTS 5,966,666 A * 10/1999 Yamaguchi et al. ......... 455/552
6,052,366 A *  4/2000 Suzuki ....................... 370/342
6,122,270 A *  9/2000 Whainnett et al.
6,160,801 A * 12/2000 Uchida et al.
6,169,733 B1 *  1/2001 Lee
6,175,746 B1 *  1/2001 Nakayama et al. ......... 455/102
6,198,730 B1 *  3/2001 Hogberg et al.

* cited by examiner

SYSTEM AND PROCESS FOR SHARED FUNCTIONAL BLOCK CDMA AND GSM COMMUNICATION TRANSCEIVERS

BACKGROUND OF THE INVENTION

1. Field of the Invention

The present invention relates, generally, to communication systems and processes which use radio frequency (RF) transmitters and receivers (transceivers), and, in particular embodiments, to systems and processes for multi-mode, multi-band Code Division Multiple Access (CDMA) and Global System for Mobile (GSM) communication transceivers that share functional blocks to minimize size, weight, complexity, power consumption, and cost.

2. Description of Related Art

It has become increasingly important to minimize the size, weight, complexity, power consumption, and cost of various electronic devices, especially personal communication devices such as cellular telephones, personal pagers, cordless telephones, and the like. One way to minimize such characteristics is to minimize the number of components and functions required in the electronic device, or to perform multiple functions using the same components. However, personal communication devices such as cellular telephones often require complex circuitry with a number of power-inefficient components for performing particular functions. This is especially true in modern cellular communications, where several different communication standards are employed worldwide, and cellular telephones with the flexibility to operate under multiple communications standards are highly desirable from a consumer and manufacturing perspective.

For example, the GSM communication standard is a world-wide mode of digital cellular communication operating over three different frequency bands. GSM-900 operates in the 900 MHz frequency band and is currently used in Europe and Asia. DCS is another digital cellular standard based on GSM technology, operating in the 1800 MHz frequency band and also currently used in Europe and Asia. The United States uses PCS, a third digital cellular standard similar to DCS, but operating in the 1900 MHz band. GSM is currently used in approximately 154 countries, including the geographic areas of North Africa, India, China, Europe, the Middle East, and Taiwan.

However, GSM is not the only mode of cellular communication. CDMA is another mode of digital cellular communication operating in either the 900 or 1900 MHz band. CDMA is one of the most widely used modes of cellular communication in the United States, and is the most widely used mode of cellular communication in Korea. CDMA is also being used in China, India, and Taiwan.

With improved voice and data communications and political climates continuing to expand the world market, a "world telephone" capable of operating in many different countries would be of interest to international business travelers. Multi-mode, multi-band cellular telephones with shared functionality and an optimized architecture capable of operating under all of these standards afford consumers widespread applicability and allow manufacturers to benefit from the cost-efficiency of a common design.

However, multi-mode, multi-band cellular telephones such as combined CDMA/GSM telephones present a number of design challenges. Conventional single-band transmitters typically require two separate frequencies, a fixed intermediate frequency (IF) for modulation and a tunable RF for upconversion. Conventional single-band receivers also typically require two separate frequencies, a tunable RF for downconversion and a fixed IF for demodulation. Thus, a single-band cellular telephone may require as many as four different frequency sources. CDMA/GSM multi-band and multi-mode cellular telephones exacerbate the problem because the modulation, upconversion, downconversion, and demodulation processes for each band and mode may operate at different frequencies and amplitudes. Furthermore, the frequencies and amplitudes employed by each band and mode may require different filters and amplifiers for the transmit and receive function of each band. The design challenge of producing cellular telephones of minimal size, weight, complexity, power consumption, and cost is thus compounded by multi-mode, multi-band cellular telephones.

SUMMARY OF THE DISCLOSURE

Therefore, it is an object of embodiments of the present invention to provide a system and process for a multi-mode, multi-band CDMA and GSM communication transceiver that shares functional blocks to minimize size, weight, complexity, power consumption, and cost.

These and other objects are accomplished according to a communication system for communicating CDMA and GSM transmit and receive RF information signals through one or more antennas. The communication system is comprised of a transmitting unit, a receiving unit, and at least one antenna. The transmitting unit modulates and upconverts a transmit baseband information signal to generate a CDMA transmit RF information signal and a GSM transmit RF information signal. The receiving unit downconverts and demodulates a CDMA receive RF information signal and a GSM receive RF information signal to generate a receive baseband information signal. One or more antennas are coupled to the transmitting unit and receiving unit for transmitting the CDMA transmit RF information signal and the GSM transmit RF information signal, and receiving the CDMA receive RF information signal and the GSM receive RF information signal.

The transmitting unit comprises a modulator for modulating a transmit IF local oscillator frequency (LO) with the transmit baseband information signal to generate a transmit IF information signal. It also includes a plurality of upconverters for upconverting the transmit IF information signal with a GSM transmit RF LO to generate the GSM transmit RF information signal, and for upconverting the transmit IF information signal with a CDMA transmit RF LO to generate the CDMA transmit RF information signal.

The receiving unit comprises a downconverter for downconverting the CDMA receive RF information signal with a receive RF LO to generate a receive IF information signal, and for downconverting the GSM receive RF information signal with the receive RF LO to generate a receive IF information signal. It also includes a demodulator for demodulating the receive IF information signal with a receive IF LO to generate the receive baseband information signal.

A transmit IF variable gain amplifier is coupled between the modulator and the plurality of upconverters for amplifying the transmit IF information signal. The plurality of upconverters includes a translation loop for upconverting the transmit IF information signal with the GSM transmit RF LO, and an upconverter mixer for upconverting the transmit IF information signal with the CDMA transmit RF LO.

These and other objects, features, and advantages of embodiments of the to invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Cellular communication systems employ several different communication standards worldwide and utilize several different frequency bands. For example, the GSM communication standard operates over three different bands, 900 MHz, 1800 MHz, and 1900 MHz, while the CDMA communication standard operates over two different bands, 900 MHz and 1900 MHz. Multi-mode, multi-band cellular telephones, with the flexibility to operate under multiple communications standards, afford consumers widespread applicability and allow manufacturers to benefit from the cost-efficiency of a common design.

To realize a cost-efficient design, multi-mode, multi-band cellular telephones must minimize size, weight, complexity, and power consumption. Embodiments of the present invention therefore relate to multi-mode, multi-band cellular communication transceivers that share frequency sources, amplifiers, and mixers between bands and modes. It should be noted, however, that transceivers according to embodiments of the present invention are not unique to cellular communications and may be employed in a variety of communications electronics, including wireless transmission systems as well as wired systems. Thus, embodiments of the invention described herein may involve various forms of communications systems. However, for purposes of simplifying the present disclosure, preferred embodiments of the present invention are described herein in relation to personal wireless communications systems, including, but not limited to digital mobile telephones, digital cordless telephones, digital pagers, combinations thereof, and the like. Such personal communications systems typically include one or more portable or remotely located receiver and/or transmitter units.

Regardless of the form of the communication system, embodiments of the present invention combine two communication modes, GSM and CDMA. In CDMA-900, frequency bands are allocated such that a mobile subscriber unit will transmit signals over a transmit band of about 824–849 MHz and receive signals over a receive band of about 869–894 MHz. In CDMA-1900, frequency bands are allocated such that a mobile subscriber unit will transmit signals over a transmit band of about 1850–1910 MHz and receive signals over a receive band of about 1930–1990 MHz. Note that CDMA functional blocks employed in embodiments of the present invention should conform to Telecommunications Industry Association (TIA)/Electronic Industry Association (EIA)/Interim Standard (IS) "CDMA-900" (TIA/EIA/IS-95-A and TIA/EIA/IS-98-A), and American National Standards Institute, Inc. (ANSI) "CDMA-1900" (J-STD-018), standards that are well understood by those skilled in the art. These standards are incorporated herein by reference.

GSM is used herein to refer generally to three different applications of the GSM communication standard, GSM-900, DCS, and PCS. In GSM-900, frequency bands are allocated such that a mobile subscriber unit will transmit signals over a transmit band of between about 890 and 915 MHz and will receive signals over a receive band of between about 935 to 960 MHz. The transmit band is broken up into 125 channels, each channel separated by 200 kHz. In DCS, frequency bands are allocated such that a mobile subscriber unit will transmit signals over a transmit band of between about 1710 and 1785 MHz and will receive signals over a receive band of between about 1805 and 1880 MHz. The transmit band is broken up into 375 channels, each channel separated by 200 kHz. In PCS, frequency bands are allocated such that a mobile subscriber unit will transmit signals over a transmit band of between about 1850 and 1910 MHz and will receive signals over a receive band of between about 1930 and 1990 MHz. The transmit band is broken up into 300 channels, each channel separated by 200 kHz. It should be noted that GSM functional blocks employed in embodiments of the present invention conform to European Telecommunications Standards Institute (ETSI) "GSM-900 & DCS-1800" (GSM 05.05, GSM 11.10-1, and TBR 5) and American National Standards Institute, Inc. (ANSI) "GSM-1900" (J-STD-007 Volumes 0–7), standards that are well understood by those skilled in the art. These standards are incorporated herein by reference.

Thus, embodiments of the present invention include the following GSM/CDMA combinations: CDMA-900 and CSM-900, CDMA-900 and DCS, CDMA-900 and PCS, CDMA-1900 and CSM-900, CDMA-1900 and DCS, and CDMA-1900 and PCS. It should be noted, however, that although the illustrated embodiments are limited to dual-mode, dual-band transceivers, alternative embodiments of the present invention include multi-mode, multi-band transceivers such as a combined CDMA-1900, PCS, and DCS transceiver. In such an embodiment, the PCS and DCS transmit and receive paths may contain paralleled filters to accommodate the relatively slight frequency differences between PCS and DCS.

Figure 1:
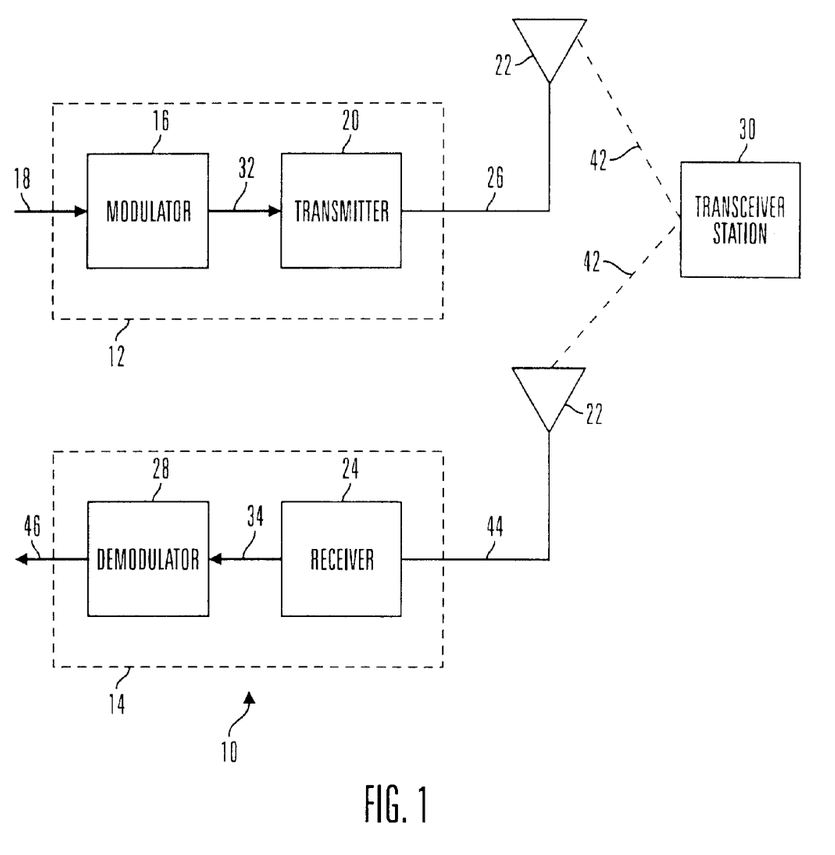
FIG. 1 is block diagram representation of a system environment according to an example embodiment of the present invention.

A generalized representation of a communication system according to an embodiment of the present invention is shown in FIG. 1, wherein a transceiver 10 includes a transmitting unit 12 and a receiving unit 14, coupled for communication over a communication channel 42. Transmitting unit 12 includes a modulator 16 coupled to receive a transmit baseband information signal 18 from a signal source (not shown in FIG. 1). In one representative embodiment, the signal source may include, for example, a microphone for converting sound waves into electronic signals and sampling and analog-to-digital converter electronics for sampling and converting the electronic signals into digital signals representative of the sound waves. In other embodiments, the signal source may include any suitable device for producing digital data signals for communication over channel 42, such as, but not limited to, a keyboard, a digital voice encoder, a mouse or other user input device, a sensor, monitor or testing apparatus, or the like.

Modulator 16 provides a transmit IF information signal 32 as an output to a transmitter 20. A transmit RF information signal 26 is produced by transmitter 20 for transmission from an antenna 22. Receiving unit 14 includes a receiver 24 coupled to an antenna 22 to process a receive RF information signal 44. Receiver 24 provides a modulated receive IF information signal 34 to a demodulator 28, which demodulates receive IF information signal 34 and generates receive baseband information signals 46.

The demodulated receive baseband information signals 46 from demodulator 28 may be provided to signal processing electronics, sound producing electronics or the like, depending upon the nature of use of the transceiver 10. The transmitting and receiving units 12 and 14 include further components, power supplies, and the like, well known in the art for effecting transmission and reception of signals and for carrying out other functions specific to the nature and application of use of the transceiver 10.

In preferred transceiver embodiments, such as cellular telephone embodiments or cordless telephone embodiments, each transmitting unit 12 and receiving unit 14 is configured to function as both a transmitting unit and a receiving unit. In one system embodiment, transmitting unit 12 and receiving unit 14 transmit and receive signals directly therebetween. In other system embodiments, transmitting unit 12 and receiving unit 14 communicate through one or more additional transceiver stations 30 (such as repeaters, base or cell stations, or the like).

Figure 2:
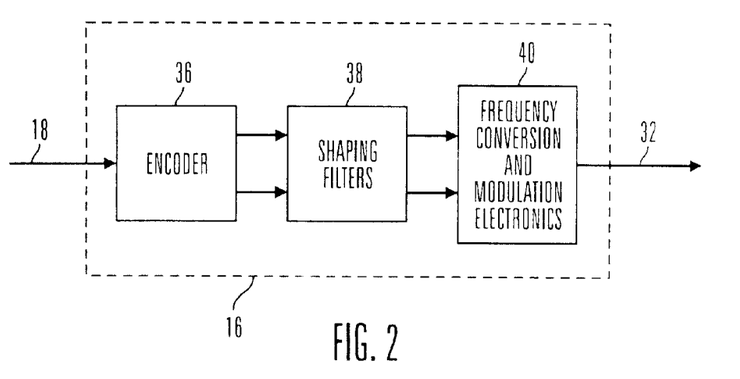
FIG. 2 is a more detailed block diagram representation of the modulator in the system of FIG. 1.

As illustrated in the modulator 16 of FIG. 2, in digital cellular telephone or to cordless telephone system embodiments transmit baseband information signal 18 provides sampled voice (or sound) signals in the form of baseband I and Q channel signals to an encoder 36. In one preferred cellular telephone embodiment, encoder 36 comprises a Phase Shift Key encoder, such as, but not limited to, a π/4-shift Quadrature Phase Shift Key mapper with differential encoder (π/4 DQPSK), and shaping filters 38 comprise pulse shaping filters for smoothing the encoder output signal. An example of a π/4 DQPSK and pulse shaping electronics is described in the article titled: "π/4-shift QPSK Digital Modulator LSIC for Personal Communication Terminals," by Tetsu Sakata, Kazuhiko Seki, Shuji Kubota and Shuzo Kato, Proc. 5th IEEE International Symposium on Personal, Indoor and Mobile Radio Communications, 1994 (incorporated herein by reference). Other embodiments may employ other suitable encoding schemes, including but not limited to Amplitude Shift Keying and Frequency Shift Keying schemes.

I and Q outputs of the encoder pass through shaping filters 38 and then to frequency conversion and modulation electronics 40, the output of which comprises a transmit IF information signal 32. Transmit IF information signal 32 is then fed to transmitter 20 as shown in FIG. 1, which provides the transmit RF information signal 26 to the antenna 22 for transmission.

Figure 3:
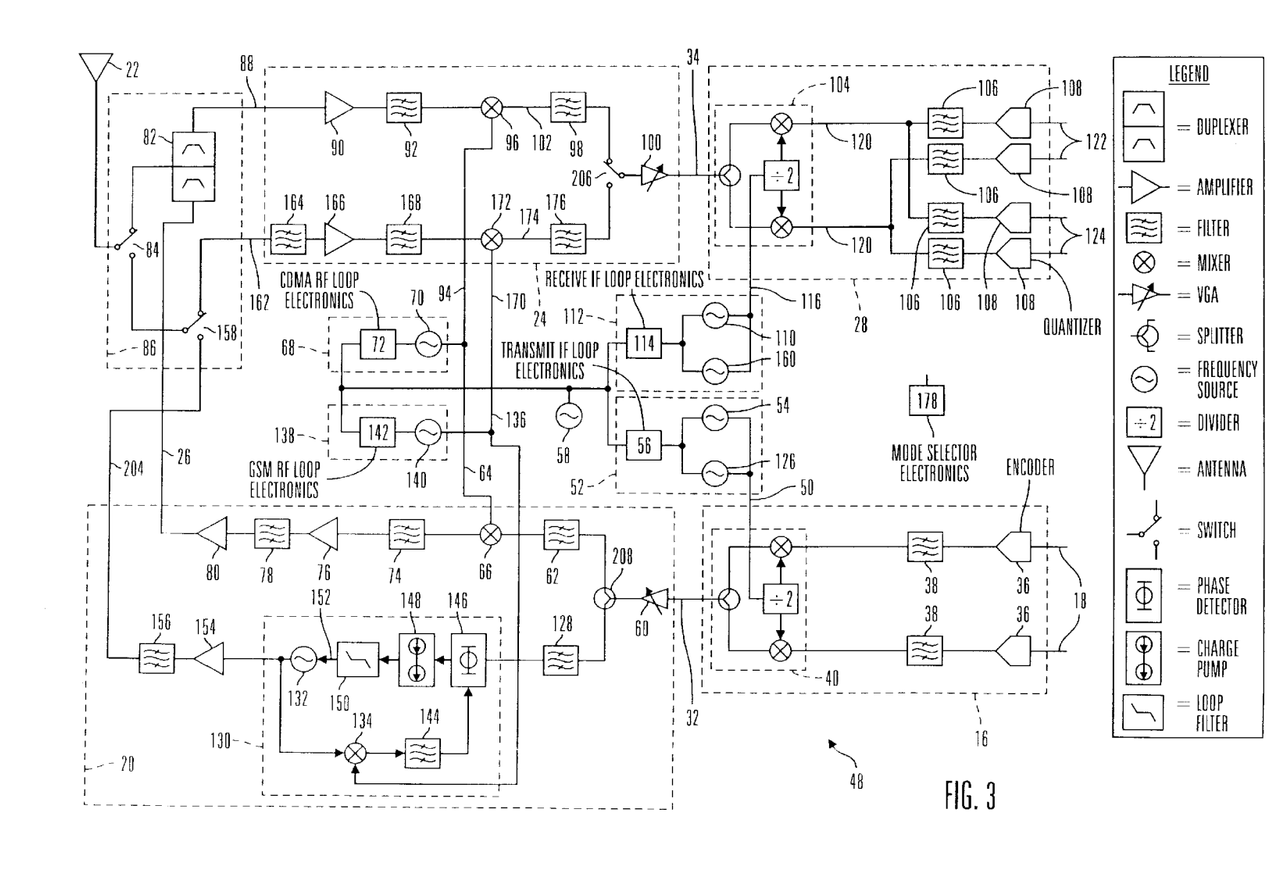
FIG. 3 is a block diagram representation of a shared functional block CDMA-1900 and GSM-900 communication transceiver according to an embodiment of the present invention.

A shared functional block CDMA-1900 and CSM-900 communication transceiver 48 according to an embodiment of the present invention is illustrated in FIG. 3. The transceiver 48 includes a modulator 16 as described above with reference to FIG. 2. In the transmit path, frequency conversion and modulation electronics 40 receive the I and Q outputs of shaping filters 38 and modulate a transmit IF LO 50 with the I and Q outputs to produce a transmit IF information signal 32 at an IF carrier frequency. Transmit IF LO 50 is generated by a transmit IF LO frequency generator 52 comprising a CDMA transmit IF LO frequency source 54 phase-locked to a reference source 58 by transmit IF LO loop electronics 56. In preferred embodiments of the present invention, CDMA transmit IF LO frequency source 54 is a voltage controlled oscillator (VCO). However, in alternative embodiments of the present invention, CDMA transmit IF LO frequency source 54 may be any adjustable frequency source.

Transmit IF information signal 32 is then amplified by a transmit IF variable gain amplifier (VGA) 60 within transmitter 20, which adjusts its gain based on commands received from the base station. It should be noted that although a variable gain amplifier is not required for GSM, power control is critical in CDMA, and thus because transmit IF VGA 60 is shared between the CDMA and GSM receive paths, transmit IF VGA 60 must have variable gain capability to meet the power control requirements of CDMA.

The output of transmit IF VGA 60 is split by first transmit IF power splitter 208, and in the CDMA-1900 transmit path is then filtered by CDMA transmit IF filter 62, which filters out noise generated by the transmit IF VGA 60 in the receive band to meet receive band noise floor requirements. CDMA transmit IF filter 62 has a center frequency approximately equivalent to the IF carrier frequency and a bandwidth sufficient to pass the modulated and amplified transmit IF information signal with minimal distortion. CDMA has a modulation bandwidth of 1.25 MHz, thus the bandwidth of CDMA transmit IF filter 62 must be at least 1.25 MHz. In preferred embodiments, the bandwidth of CDMA transmit IF filter 62 is about 5 MHz. The modulated, amplified, and filtered transmit IF information signal is then mixed with a CDMA transmit RF LO 64 in CDMA transmit upconverter mixer 66. In preferred embodiments, CDMA transmit upconverter mixer 66 generates the difference between the output of CDMA transmit IF filter 62 and CDMA transmit RF LO 64.

In embodiments of the present invention, CDMA transmit RF LO 64 is generated by a CDMA RF LO frequency generator 68 containing a CDMA RF LO frequency source 70 phase-locked to reference source 58 by CDMA RF LO loop electronics 72. In preferred embodiments, CDMA RF LO frequency source 70 comprises a VCO. However, in alternative embodiments, CDMA RF LO frequency source 70 may be any adjustable frequency source.

The output of CDMA transmit upconverter mixer 66 is filtered by first CDMA transmit RF filter 74 which, in the CDMA-1900 example of FIG. 3, has a passband encompassing the CDMA-1900 transmit band of about 1850–1910 MHz to remove spurious frequencies generated by CDMA transmit upconverter mixer 66. The output of first CDMA transmit RF filter 74 is then amplified by CDMA transmit RF driver amplifier 76. The output of CDMA transmit RF driver amplifier 76 is then filtered by second CDMA transmit RF filter 78, which in the CDMA-1900 example of FIG. 3 has a passband encompassing the CDMA-1900 transmit band of about 1850–1910 MHz to filter out noise in the CDMA-1900 receive band generated by CDMA transmit RF driver amplifier 76. The output of second CDMA transmit RF filter 78 is then amplified by CDMA transmit RF power amplifier 80 to generate CDMA transmit RF information signal 26 at a level sufficient to meet output power requirements at antenna 22. CDMA transmit RF information signal 26 is then filtered by duplexer 82, which in the CDMA-1900 example of FIG. 3 has a transmit passband encompassing the CDMA-1900 transmit band of about 1850–1910 MHz to filter out-of-band noise generated by CDMA transmit RF power amplifier 80. The output of duplexer 82 then passes through mode select switch 84 within antenna coupling electronics 86 before being transmitted by antenna 22. In alternative embodiments of the present invention, mode select switch 84 may be an RF switch, a resistor combiner, or a duplexer.

In the CDMA-1900 receive path, signals from antenna 22 enter antenna coupling electronics 86, where they pass through mode select switch 84 and are filtered by duplexer 82 having a receive passband approximately equivalent to the CDMA-1900 receive band of about 1930–1990 MHz for passing only CDMA-1900 receive band signals. The output of duplexer 82 is CDMA receive RF information signal 88.

CDMA receive RF information signal 88 is then amplified by a CDMA receive RF LNA 90. The output of CDMA receive RF LNA 90 is then filtered by a CDMA receive RF image reject filter 92. CDMA receive RF image reject filter 92 is a bandpass filter with a passband approximately equivalent to the CDMA-1900 receive band of about 1930–1990 MHz to filter out image noise generated by CDMA receive RF LNA 90 capable of mixing with CDMA receive RF LO 94 in CDMA receive downconverter mixer 96 and producing unwanted signals in the IF band. In preferred embodiments of the present invention, CDMA receive RF LO 94 is generated by CDMA RF LO frequency generator 68, and CDMA receive downconverter mixer 96 generates the difference between the output of CDMA receive RF image reject filter 92 and CDMA receive RF LO 94, designated herein as CDMA receive IF information signal 102. It should be noted that in alternative embodiments of the present invention, active image cancellation such as an image reject mixer may be employed, eliminating the need for CDMA receive RF image reject filter 92.

CDMA receive IF information signal 102 then passes through a CDMA receive IF filter 98 with a bandwidth approximately equivalent to the CDMA modulation bandwidth of 1.25 MHz to remove spurious frequencies generated by CDMA receive downconverter mixer 96. The output of CDMA receive IF filter 98 is then coupled to receive IF VGA 100 through a first receive IF switch 206. Receive IF VGA 100 provides variable gain control by adjusting its gain based on commands received from the base station. The output of receive IF VGA 100 is receive IF information signal 34.

Receive IF information signal 34 is mixed with receive IF LO 116 and demodulated by frequency conversion and demodulation electronics 104 within demodulator 28. In embodiments of the present invention, receive IF LO 116 is generated by a receive IF LO frequency generator 112 comprising a CDMA receive IF LO frequency source 110 phase-locked to reference source 58 by receive IF LO loop electronics 114. In preferred embodiments, CDMA receive IF LO frequency source 110 is a VCO. However, in alternative embodiments, CDMA receive IF LO frequency source 110 may be any adjustable frequency source.

Frequency conversion and demodulation electronics 104 produce baseband information signals 120, characterized herein as either DC or a "near DC" IF (for example, a center frequency above about 1 MHz). In the CDMA-1900 receive path, these baseband information signals 120 are filtered by CDMA baseband filters 106 to remove spurious frequencies generated by frequency conversion and demodulation electronics 104. CDMA baseband filters 106 have a bandwidth of about 1.25 MHz to accommodate the modulation bandwidth of CDMA receive baseband signals, and may be low pass filters if the receive baseband signals are DC, or bandpass filters if the receive baseband signals are near DC. The filtered and demodulated receive baseband signals are then processed by quantizers 108, which generate CDMA I and Q outputs 122. In preferred embodiments, quantizers 108 are analog-to-digital converters (ADCs).

The CSM-900 transmit path shares modulator 16 and transmit IF VGA 60 with the CDMA-1900 transmit path. However, transmit IF LO 50, used by frequency conversion and modulation electronics 40 to generate transmit IF information signal 32, is produced by GSM transmit IF LO frequency source 126 within transmit IF LO frequency generator 52. GSM transmit IF LO frequency source 126 is coupled in parallel with CDMA transmit IF LO frequency source 54 and is phase-locked to reference source 58 by transmit IF LO loop electronics 56.

The CSM-900 transmit path diverges from the CDMA-1900 transmit path at the output of transmit IF VGA 60, where the output of transmit IF VGA 60 is split by first transmit IF power splitter 208 and filtered by GSM transmit IF filter 128, which filters out noise generated by the transmit IF VGA 60 in the GSM receive band to meet receive band noise floor requirements. GSM transmit IF filter 128 has a center frequency approximately equivalent to the:IF carrier frequency and a bandwidth sufficient to pass the modulated and amplified-transmit IF information signal with minimal distortion. GSM has a modulation bandwidth of 200 kHz, thus the bandwidth of GSM transmit IF filter 128 must be at least 200 kHz. In preferred embodiments, the bandwidth of GSM transmit IF filter 128 is about 1 MHz.

In preferred embodiments of the present invention, the output of GSM transmit IF filter 128 is then upconverted by a translation loop 130. In further preferred embodiments, translation loop 130 includes a GSM VCO 132 coupled to a translation loop mixer 134 and phase-locked to a GSM transmit RF LO 136 for generating GSM RF carrier frequencies. Translation loop 130 acts like a tracking filter with a center. frequency at the frequency of the GSM VCO 132.

In embodiments of the present invention, GSM transmit RF LO 136 is generated by a GSM RF LO frequency generator 138 comprising a GSM RF LO frequency source 140 phase-locked to reference source 58 by GSM RF LO loop electronics 142. In preferred embodiments, GSM RF LO frequency source 140 comprises a VCO. However, in alternative embodiments, GSM RF LO frequency source 140 may be any adjustable frequency source.

In preferred embodiments, translation loop mixer 134 generates the difference between GSM VCO 132 and GSM transmit RF LO 136. Translation loop 130 further includes a feedback filter 144 for filtering the output of translation loop mixer 134 to remove mixer noise, a phase detector 146 for determining the phase difference between the output of feedback filter 144 and GSM transmit IF filter 128, a charge pump 148 for sourcing or sinking current as determined by the phase difference output of phase detector 146, and a loop filter 150 for integrating current pulses from charge pump 148 and providing a control voltage 152 to GSM VCO 132.

The modulated, upconverted output of GSM VCO 132 is then amplified by GSM transmit RF power amplifier 154 to generate a GSM transmit RF information signal at a level sufficient to meet output power requirements at antenna 22. The output of GSM transmit RF power amplifier 154 is then filtered by GSM transmit RF filter 156, which in the CSM-900 example of FIG. 3 has a transmit passband encompassing the CSM-900 transmit band of about 890–915 MHz to filter out-of-band noise generated by GSM transmit RF power amplifier 154. The output of GSM transmit RF filter 156, identified herein as GSM transmit RF information signal 204, then passes through transmit/receive switch 158 within antenna coupling electronics 86 and mode select switch 84 before being transmitted by antenna 22. In alternative embodiments of the present invention, transmit/receive switch 158 may be an RF switch, a resistor combiner, or a duplexer.

It should be noted that because translation loop 130 in the GSM transmit path generates a relatively clean (minimal out-of-band noise) signal from GSM VCO 132, there is no need for a high-insertion loss duplexer, as used in the CDMA transmit path. The elimination of the duplexer enables a lower power GSM transmit RF power amplifier to be used, resulting in substantial power savings in the communication transceiver. The CDMA transmit path cannot use a translation loop, however, because a translation loop cannot track the amplitude information present in a CDMA Offset QPSK (OQPSK) signal.

Notwithstanding the advantages of using a translation loop, in alternative embodiments of the present invention translation loop 130 may be replaced by an upconverter mixer as in the CDMA transmit path. In such embodiments, transmit/receive switch 158 may be replaced with a duplexer to filter out-of-band noise generated by GSM transmit RF power amplifier 154.

In the CSM-900 receive path, signals from antenna 22 enter antenna coupling electronics 86, where they pass through mode select switch 84 and transmit/receive switch 158. The output of transmit/receive switch 158 is GSM receive RF information signal 162, which is filtered by preselector filter 164 having a receive passband approximately equivalent to the CSM-900 receive band of about 935–960 MHz for passing only CSM-900 receive band signals.

The output of preselector filter 164 is then amplified by a GSM receive RF LNA 166. The output of GSM receive RF LNA 166 is then filtered by a GSM receive RF image reject filter 168. GSM receive RF image reject filter 168 is a bandpass filter with a bandwidth approximately equivalent to the CSM-900 receive band of about 935–960 MHz to filter out image noise generated by GSM receive RF LNA 166 capable of mixing with GSM receive RF LO 170 in GSM receive downconverter mixer 172 and producing unwanted signals in the IF band. In preferred embodiments of the present invention, GSM receive RF LO 170 is generated by GSM RF LO frequency generator 138, and GSM receive downconverter mixer 172 generates the difference between the output of GSM receive RF image reject filter 168 and GSM receive RF LO 170, designated herein as GSM receive IF information signal 174. It should be noted that in alternative embodiments of the present invention, active image cancellation such as an image reject mixer may be employed, eliminating the need for GSM receive RF image reject filter 168.

GSM receive IF information signal 174 then passes through a GSM receive IF filter 176 with a bandwidth approximately equivalent to the GSM modulation bandwidth of 200 kHz to remove spurious frequencies generated by GSM receive downconverter mixer 172.

The output of GSM receive IF filter 176 is then coupled to receive IF VGA 100 by first receive IF switch 206, where it is amplified by receive IF VGA 100. However, as previously noted, the output of CDMA receive IF filter 98 is also coupled to receive IF VGA 100 by first receive IF switch 206. Thus, the gain, NF, and IIP3 of the shared receive IF VGA 100 must be chosen to satisfy the requirements of both the CDMA-1900 and CSM-900 receive paths. In alternative embodiments of the present invention, first receive IF switch 206 may comprise a switchable high off-state impedance buffer amplifiers or an RF switch.

Receive IF information signal 34 is then mixed with receive IF LO 116 and demodulated by frequency conversion and demodulation electronics 104 within demodulator 28. Because the IF frequencies of CDMA-1900 and CSM-900 may be different, receive IF LO 116 as used for GSM demodulation is not generated by CDMA receive IF LO frequency source 110. Instead, receive IF LO 116 as used for GSM demodulation is generated by a GSM receive IF LO frequency source 160 in parallel with CDMA receive IF LO frequency source 110 and phase-locked to reference source 58 by receive IF LO loop electronics 114. In preferred embodiments of the present invention, GSM receive IF LO frequency source 160 is a VCO. However, in alternative embodiments, GSM receive IF LO frequency source 160 may be any adjustable frequency source.

Frequency conversion and demodulation electronics 104 produce baseband information signals 120. In the CSM-900 receive path, these baseband information signals 120 are filtered by GSM baseband filters 118 to remove spurious frequencies generated by frequency conversion and demodulation electronics 104. GSM baseband filters 118 have a bandwidth of about 200 kHz to accommodate the modulation bandwidth of GSM receive baseband signals, and may be low pass filters if the receive baseband signals are DC, or bandpass filters if the receive baseband signals are near DC. The filtered and demodulated receive baseband signals are then processed by quantizers 108, which generate GSM I and Q outputs 124. In preferred embodiments, quantizers 108 are analog-to-digital converters (ADCs).

In embodiments of the present invention, mode selector electronics 178 configures the CDMA-1900 and CSM-900 communication transceiver 48 for either CDMA or GSM operation. In preferred embodiments of the present invention, mode selector electronics 178 is a processing device automatically configurable by remote commands or signal strength measurements received from base stations. In alternative embodiments, mode selector electronics 178 may comprise a factory-programmable logic device or user-configurable logic. When mode selector electronics 178 is configured for CDMA operation, mode select switch 84 is configured to couple duplexer 82 to antenna 22, receive IF LO frequency generator 112 is configured to couple CDMA receive IF LO frequency source 110 to frequency conversion and demodulation electronics 104, and transmit IF LO frequency generator 52 is configured to couple CDMA transmit IF LO frequency source 54 to frequency conversion and modulation electronics 40. When mode selector electronics 178 is configured for GSM operation, mode select switch 84 is configured to couple transmit/receive switch 158 to antenna 22, receive IF LO frequency generator 112 is configured to couple GSM receive IF LO frequency source 160 to frequency conversion and demodulation electronics 104, and transmit IF LO frequency generator 52 is configured to couple GSM transmit IF LO frequency source 126 to frequency conversion and modulation electronics 40.

Embodiments of the present invention described above employ a separate CDMA transmit IF LO frequency source 54 and GSM transmit IF LO frequency source 126. However, in alternative embodiments of the present invention, CDMA transmit IF LO frequency source 54 and GSM transmit IF LO frequency source 126 may comprise a single tunable transmit IF LO frequency source. Similarly, embodiments of the present invention described above disclose a separate CDMA receive IF LO frequency source 110 and GSM receive IF LO frequency source 160. However, in alternative embodiments of the present invention, CDMA receive IF LO frequency source 110 and GSM receive IF LO frequency source 160 may comprise a single tunable receive IF LO frequency source.

Furthermore, embodiments of the present invention described above employ a single CDMA RF LO frequency source 70. However, in alternative embodiments of the present invention, CDMA RF LO frequency source 70 may comprise a separate CDMA receive RF LO frequency source and a separate CDMA transmit RF LO frequency source. Similarly, embodiments of the present invention described above disclose a single GSM RF LO frequency source 140. However, in alternative embodiments of the present invention, GSM RF LO frequency source 140 may comprise a separate GSM receive RF LO frequency source and a separate GSM transmit RF LO frequency source.

Figure 4:
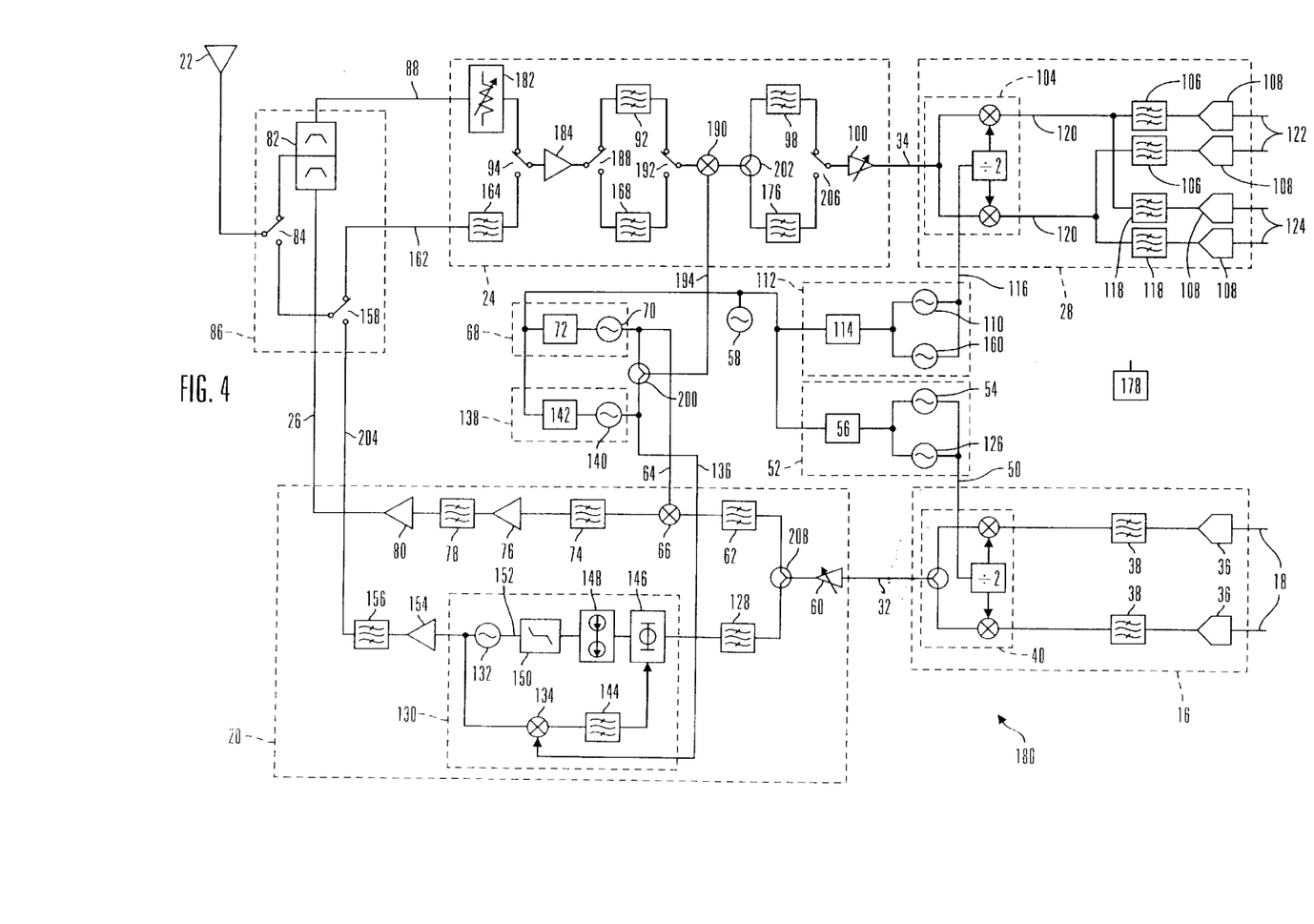
FIG. 4 is a block diagram representation of a shared functional block CDMA-900 and GSM-900 communication transceiver according to an embodiment of the present invention.

A shared functional block CDMA-900 and CSM-900 communication transceiver 180 according to an embodiment of the present invention is illustrated in FIG. 4. The architecture and operation of CDMA-900 and CSM-900 communication transceiver 180 in FIG. 4 is similar to that of CDMA-1900 and CSM-900 communication transceiver 48 in FIG. 3, except as noted below. Referring to FIG. 4, in the CDMA receive path, CDMA receive RF information signal 88 passes through a variable gain attenuator 182 in preferred embodiments of the present invention. Unlike the CDMA-1900 communication standard, which only specifies one composite signal level for purposes of test, the CDMA-900 communication standard specifies three different composite signals for purposes of test, and thus variable gain attenuator 182 selectively attenuates the received signal to meet CDMA communication standard cellular receive band intermodulation requirements. However, in alternative embodiments, attenuation control may be achieved by selectively bypassing common receive RF LNA 184, or a variable gain common receive RF LNA 184 may be employed instead of variable gain attenuator 182.

The output of variable gain attenuator 182 in the CDMA receive path and preselector filter 164 in the GSM receive path are coupled by a first receive RF switch 186, which, in alternative embodiments of the present invention, may be an RF switch, high off-state impedance amplifiers or transmission gates, a resistor combiner, or a duplexer. First receive RF switch 186 allows common receive RF LNA 184 to be used in both the CDMA and GSM receive paths. The use of a single, limited frequency range LNA is possible in CDMA-900 and CSM-900 communication transceiver 180 because the frequency bands of CDMA-900 and CSM-900 are similar. Because common receive RF LNA 184 is shared between the CDMA-900 and CSM-900 receive paths, the gain, NF, and IIP3 of common receive RF LNA 184 must be chosen to satisfy the requirements of both the CDMA-900 and CSM-900 receive paths. The output of common receive RF LNA 184 is then coupled to either CDMA receive RF image reject filter 92 or GSM receive RF image reject filter 168 by second receive RF switch 188. In alternative embodiments of the present invention, second receive RF switch 188 may be an RF switch, high off-state impedance amplifiers or transmission gates, a resistor combiner, or a duplexer.

The outputs of CDMA receive RF image reject filter 92 and GSM receive RF image reject filter 168 are then coupled to common receive downconverter mixer 190 by third receive RF switch 192. Third receive RF switch 192 allows common receive downconverter mixer 190 to be used in both the CDMA and GSM receive paths, which is possible because of the small frequency difference between the receive bands of CDMA-900 and CSM-900. Because common receive downconverter mixer 190 is shared between the CDMA-900 and CSM-900 receive paths, the gain, NF, and IIP3 of common receive downconverter mixer 190 must be chosen to satisfy the requirements of both the CDMA-900 and CSM-900 receive paths. In alternative embodiments of the present invention, third receive RF switch 192 may be an RF switch, high off-state impedance amplifiers or transmission gates, a resistor combiner, or a duplexer. Downconverter mixer 190 mixes either the output of CDMA receive RF image reject filter 92 or the output of GSM receive RF image reject filter 168 with a common receive RF LO 194.

Common receive RF LO 194 is produced by coupling CDMA RF LO frequency source 70 and GSM RF LO frequency source 140 with a common receive RF LO power combiner 200. The output of common receive RF LO power combiner 200 is approximately equivalent to either the output of CDMA RF LO frequency source 70 or the output of GSM RF LO frequency source 140, because mode selector electronics 178 enables either CDMA RF LO frequency source 70 or GSM RF LO frequency source 140, but not both.

The output of downconverter mixer 190 is coupled to CDMA receive IF filter 98 and GSM receive IF filter 176 through common receive IF power splitter 202, which distributes a signal approximately equal in amplitude and phase to CDMA receive IF filter 98 and GSM receive IF filter 176. In preferred embodiments, CDMA receive IF filter 98 and GSM receive IF filter 176 are surface acoustic wave (SAW) filters, because SAW filters act as high impedance elements for out-of-band frequencies. The outputs of CDMA receive IF filter 98 and GSM receive IF filter 176 are coupled to receive IF VGA 100 by first receive IF switch 206. Because receive IF VGA 100 is shared between the CDMA-900 and CSM-900 receive paths, the gain, NF, and IIP3 of receive IF VGA 100 must be chosen to satisfy the requirements of both the CDMA-900 and CSM-900 receive paths.

When mode selector electronics 178 is configured for CDMA operation, first receive RF switch 186 is configured to couple variable gain attenuator 182 to common receive RF LNA 184, second receive RF switch 188 is configured to couple common receive RF LNA 184 to CDMA receive RF image reject filter 92, and third receive RF switch 192 is configured to couple CDMA receive RF image reject filter 92 to common to receive downconverter mixer 190. When mode selector electronics 178 is configured for GSM operation, first receive RF switch 186 is configured to couple preselector filter 164 to common receive RF LNA 184, second receive RF switch 188 is configured to couple common receive RF LNA 184 to GSM receive RF image reject filter 168, and third receive RF switch 192 is configured to couple GSM receive RF image reject filter 168 to common receive downconverter mixer 190.

It should also be noted that the RF filters in the CDMA transmit and receive paths of CDMA-900 and CSM-900 communication transceiver 180 have different passbands as compared to those in FIG. 3. First CDMA transmit RF filter-74, second CDMA transmit RF filter 78, and duplexer 82 have transmit passbands encompassing the CDMA-900 transmit band of about 824–849 MHz. Duplexer 82 and CDMA receive RF image reject filter 92 have receive passbands approximately equivalent to the CDMA-900 receive band of about 869–894 MHz.

Figure 5:
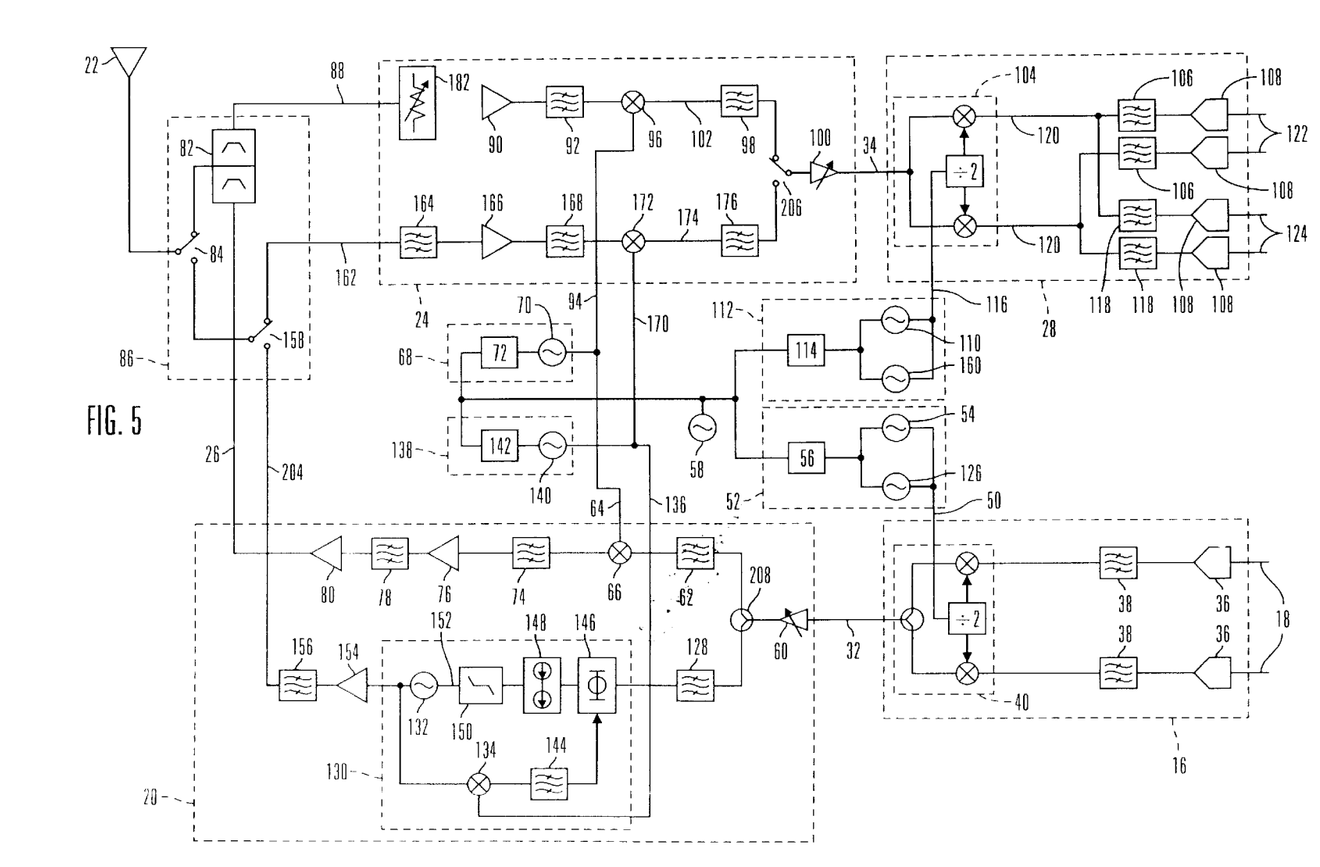
FIG. 5 is a block diagram representation of a shared functional block CDMA-1900 and PCS communication transceiver according to an embodiment of the present invention.

A shared functional block CDMA-900 and PCS communication transceiver 196 according to an embodiment of the present invention is illustrated in FIG. 5. It should be noted that a similar architecture is applicable to a shared functional block CDMA-900 and DCS communication transceiver. The architecture and operation of CDMA-900 and PCS communication transceiver 196 in FIG. 5 is similar to that of CDMA-1900 and CSM-900 communication transceiver 48 in FIG. 3, except that in the CDMA receive path, variable gain attenuator 182 is coupled between duplexer 82 and CDMA receive RF LNA 90. Note that because receive IF VGA 100 is shared by the CDMA-900 and PCS receive paths, the gain, NF, and IIP3 of the shared receive IF VGA 100 must be chosen to satisfy the requirements of both the CDMA-900 and PCS receive paths.

It should also be noted that the RF filters in the CDMA and GSM transmit and receive paths of CDMA-900 and PCS communication transceiver 196 have different passbands as compared to those in FIG. 3. First CDMA transmit RF filter 74, second CDMA transmit RF filter 78, and duplexer 82 have transmit passbands encompassing the CDMA-900 transmit band of about 824–849 MHz. Duplexer 82 and CDMA receive RF image reject filter 92 have receive passbands approximately equivalent to the CDMA-900 receive band of about 869–894 MHz. GSM transmit RF filter 156 has a transmit passband encompassing the PCS transmit band of about 1850–1910 MHz. Preselector filter 164 and GSM receive RF image reject filter 168 have receive passbands approximately equivalent to the PCS receive band of about 1930–1990 MHz.

Furthermore, in alternative embodiments of the present invention wherein the DCS communication standard replaces the PCS communication standard in FIG. 5, GSM transmit RF filter 156 has a transmit passband encompassing the DCS transmit band of about 1710–1785 MHz, and preselector filter 164 and GSM receive RF image reject filter 168 have receive passbands approximately equivalent to the DCS receive band of about 1805–1880 MHz.

Figure 6:
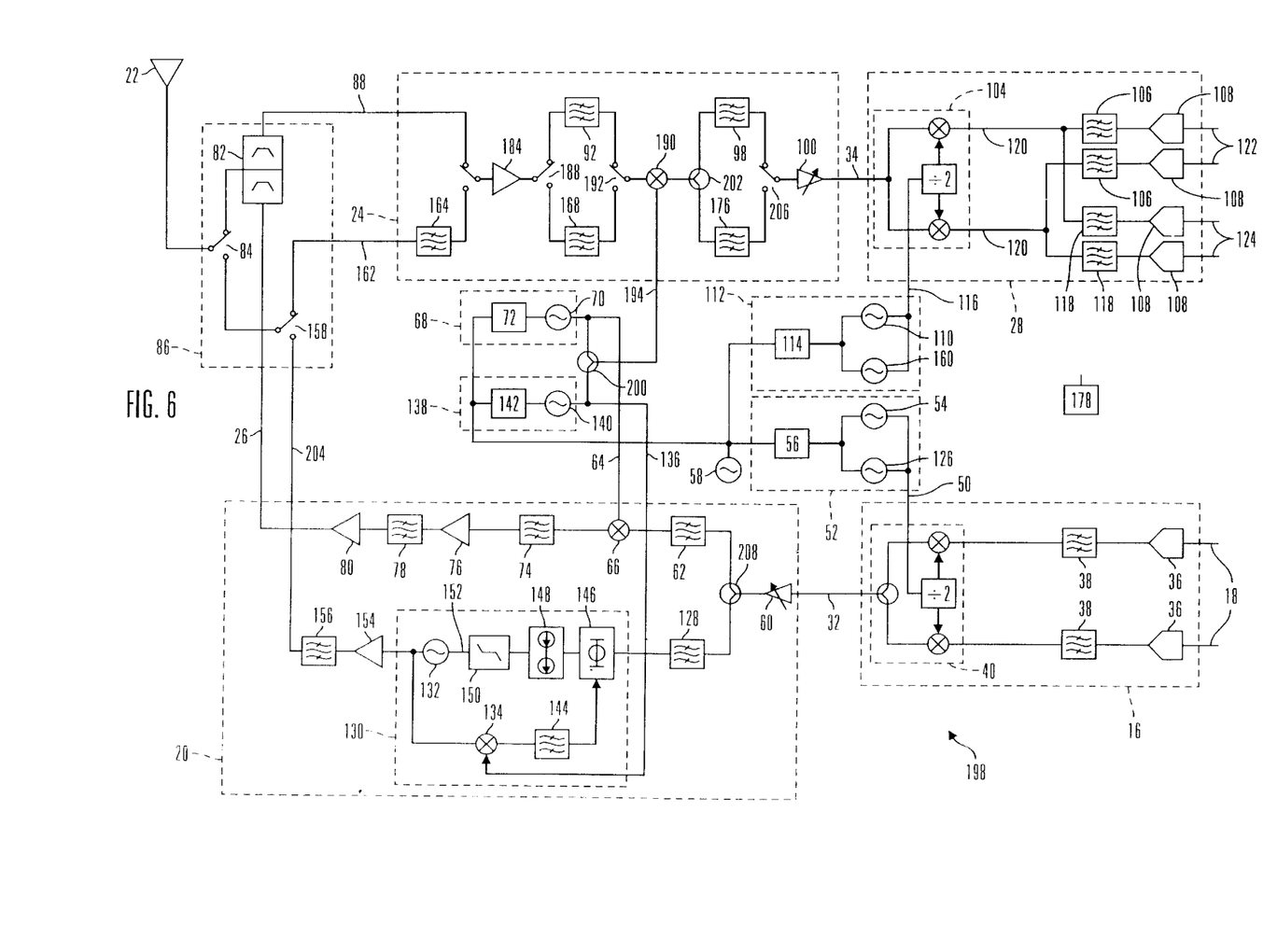
FIG. 6 is a block diagram representation of a shared functional block CDMA-1900 and PCS communication transceiver according to an embodiment of the present invention.

A shared functional block CDMA-1900 and PCS communication transceiver 198 according to an embodiment of the present invention is illustrated in FIG. 6. It should be noted that a similar architecture is applicable to a shared functional block CDMA-1900 and DCS communication transceiver. The architecture and operation of CDMA-1900 and PCS communication transceiver 198 in FIG. 6 is similar to that of CDMA-1900 and CSM-900 communication transceiver 48 in FIG. 3, except that the output of duplexer 82 in the CDMA receive path and preselector filter 164 in the GSM receive path are coupled by a first receive RF switch 186, which, in alternative embodiments of the present invention, may be an RF switch, high off-state impedance amplifiers or transmission gates, a resistor combiner, or a duplexer. First receive RF switch 186 allows common receive RF LNA 184 to be used in both the CDMA and GSM receive paths. The use of a single, limited frequency range LNA is possible in CDMA-1900 and PCS communication transceiver 198 because the frequency bands of CDMA-1900 and PCS are similar. Because common receive RF LNA 184 is shared between the CDMA-1900 and PCS receive paths, the gain, NF, and IIP3 of common receive RF LNA 184 must be chosen to satisfy the requirements of both the CDMA-1900 and PCS receive paths. The output of common receive RF LNA 184 is then coupled to either CDMA receive RF image reject filter 92 or GSM receive RF image reject filter 168 by second receive RF switch 188. In alternative embodiments of the present invention, second receive RF switch 188 may be an RF switch, high off-state impedance amplifiers or transmission gates, a resistor combiner, or a duplexer.

The outputs of CDMA receive RF image reject filter 92 and GSM receive RF image reject filter 168 are then coupled to common receive downconverter mixer 190 by third receive RF switch 192. Third receive RF switch 192 allows common receive downconverter mixer 190 to be used in both the CDMA and GSM receive paths, which is possible because of the small frequency difference between the receive bands of CDMA-1900 and PCS. Because common receive downconverter mixer 190 is shared between the CDMA-1900 and PCS receive paths, the gain, NF, and IIP3 of common receive downconverter mixer 190 must be chosen to satisfy the requirements of both the CDMA-1900 and PCS receive paths. In alternative embodiments of the-present invention, third receive RF switch 192 may be an RF switch, high off-state impedance amplifiers or transmission gates, a resistor combiner, or a duplexer. Downconverter mixer 190 mixes either the output of CDMA receive RF image reject filter 92 or the output of GSM receive RF image reject filter 168 with a common receive RF LO 194.

Common receive RF LO 194 is produced by coupling CDMA RF LO frequency source 70 and GSM RF LO frequency source 140 with a common receive RF LO power combiner 200. The output of common receive RF LO power combiner 200 is approximately equivalent to either the output of CDMA RF LO frequency source 70 or the output of GSM RF LO frequency source 140, because mode selector electronics 178 enables either CDMA RF LO frequency source 70 or GSM RF LO frequency source 140, but not both.

The output of downconverter mixer 190 is coupled to CDMA receive IF filter 98 and GSM receive IF filter 176 through common receive IF power splitter 202, which distributes a signal approximately equal in amplitude and phase to CDMA receive IF filter 98 and GSM receive IF filter 176. In preferred embodiments, CDMA receive IF filter 98 and GSM receive IF filter 176 are surface acoustic wave (SAW) filters, because SAW filters act as high impedance elements for out-of-band frequencies. The outputs of CDMA receive IF filter 98 and GSM receive IF filter 176 are coupled to receive IF VGA 100 by first receive IF filter 206. Because receive IF VGA 100 is shared between the CDMA-1900 and PCS receive paths, the gain, NF, and IIP3 of receive IF VGA 100 must be chosen to satisfy the requirements of both the CDMA-1900 and PCS receive paths.

When mode selector electronics 178 is configured for CDMA operation, first receive RF switch 186 is configured to couple duplexer 82 to common receive RF LNA 184, second receive RF switch 188 is configured to couple common receive RF LNA 184 to CDMA receive RF image reject filter 92, and third receive RF switch 192 is configured to couple CDMA receive RF image reject filter 92 to common receive downconverter mixer 190. When mode selector electronics 178 is configured for GSM operation, first receive RF switch 186 is configured to couple preselector filter 164 to common receive RF LNA 184, second receive RF switch 188 is configured to couple common receive RF LNA 184 to GSM receive RF image reject filter 168, and third receive RF switch 192 is configured to couple GSM receive RF image reject filter 168 to common receive downconverter mixer 190.

It should also be noted that the RF filters in the GSM transmit and receive paths of CDMA-1900 and PCS communication transceiver 198 have different passbands as compared to those in FIG. 3. GSM transmit RF filter 156 has a transmit passband encompassing the PCS transmit band of about 1850–1910 MHz, and preselector filter 164 and GSM receive RF image reject filter 168 have receive passbands approximately equivalent to the PCS receive band of about 1930–1990 MHz.

Furthermore, in alternative embodiments of the present invention wherein the DCS communication standard replaces the PCS communication standard in FIG. 6, GSM transmit RF filter 156 has a transmit passband encompassing the DCS transmit band of about 1710–1785 MHz, and preselector filter 164 and GSM receive RF image reject filter 168 have receive passbands approximately equivalent to the DCS receive band of about 1805–1880 MHz.

Although FIGS. 3–6 illustrate embodiments of the present invention which utilize modulation to, and demodulation from, an IF frequency, in alternative embodiments direct conversion may be employed. In direct conversion, receive RF information signals are downconverted and demodulated directly to baseband, and baseband information signals are modulated and upconverted directly to transmit RF information signals.

Therefore, according to the foregoing description, preferred embodiments of the present invention provide a system and process for a multi-mode, multi-band CDMA and GSM communication transceiver that shares frequency sources, amplifiers, and mixers between transmitters and receivers and between bands to minimize size, weight, complexity, power consumption, and cost.

The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. A cellular communication system for communicating code division multiple access (CDMA) and global system for mobile communication (GSM) transmit and receive first information signals, comprising:

a transmitting unit for modulating and upconverting a transmit baseband information signal to generate at least one CDMA transmit first information signal and at least one GSM transmit first information signal, the transmitting unit including a modulator for modulating a transmit second local oscillator (LO) frequency with the transmit baseband information signal to generate a transmit second information signal, and a plurality of upconverters for upconverting the transmit second information signal with a GSM transmit first LO frequency to generate the at least one GSM transmit first information signal and for upconverting the transmit second information signal with a CDMA transmit first LO frequency to generate the at least one CDMA transmit first information signal;

a transit variable gain amplifier coupled between the modulator and the plurality of upconverters for controllably normalizing the transmit second information signal power level for a plurality of CDMA cellular communication channels; and a receiving unit for downconverting and demodulating at least one CDMA receive first information signal and at least one GSM receive first information signal to generate a receive baseband information signal, the receiving unit including at least one downconverter for downconverting the at least one CDMA receive first information signal with a receive first LO frequency to generate a receive second information signal and for downconverting the at least one GSM receive first information signal with the receive first LO frequency to generate the receive second information signal, and a demodulator for demodulating the receive second information signal with a receive second LO frequency to generate the receive baseband information signal.

2. The communication system as recited in claim 1, wherein the plurality of upconverters comprises a translation loop for upconverting the transmit second information signal with the GSM transmit first LO frequency and an upconverter mixer for upconverting the transmit second information signal with the CDMA transmit first LO frequency.

3. A communication system as recited in claim 2, the receive first LO frequency comprising a CDMA receive first LO frequency and a GSM receive first LO frequency, the at least one downconverter comprising:

a CDMA receive low noise amplifier (LNA) coupled for amplifying the CDMA receive first information signal, a CDMA receive image reject filter coupled for filtering an output of the CDMA receive LNA, a CDMA receive downconverter mixer coupled for receiving and mixing an output of the CDMA receive image reject filter and the CDMA receive first LO frequency, and a CDMA receive filter coupled for filtering an output of the CDMA receive downconverter mixer;

a preselector filter coupled for filtering the at least one GSM receive first information signal, a GSM receive LNA coupled for amplifying an output of the preselector filter, a GSM receive image reject filter coupled for filtering an output of the GSM receive LNA, a GSM receive downconverter mixer coupled for receiving and mixing an output of the GSM receive image reject filter and the GSM receive first LO frequency, and a GSM receive filter coupled for filtering an output of the GSM receive downconverter mixer; and a receive variable gain amplifier (VGA) selectively couplable to the CDMA receive filter and the GSM receive filter for amplifying an output of the CDMA receive filter and an output of the GSM receive filter.

4. A communication system as recited in claim 3, further including:

a CDMA first LO frequency generator for generating the CDMA receive first LO frequency and the CDMA transmit first LO frequency, a GSM first LO frequency generator for generating the GSM receive first LO frequency and the GSM transmit first LO frequency, a receive second LO frequency generator for generating the receive second LO frequency, and a transmit second LO frequency generator for generating the transmit second LO frequency.

5. A communication system as recited in claim 2, the receive first LO frequency comprising a CDMA receive first LO frequency and a GSM receive first LO frequency, the at least one downconverter comprising:
   a variable gain attenuator coupled for attenuating the at least one CDMA receive first information signal, a preselector filter coupled for filtering the at least one GSM receive first information signal, a common receive LNA selectively couplable to the variable gain attenuator and the preselector filter for amplifying an output of the variable gain attenuator and the preselector filter, and a CDMA receive image reject filter and a GSM receive image reject filter selectively couplable to the common receive LNA for filtering an output of the common receive LNA; and
   a common receive downconverter mixer selectively couplable to the CDMA receive image reject filter and the GSM receive image reject filter for mixing an output of the CDMA receive image reject filter and an output of the GSM receive image reject filter with the receive first LO frequency, a CDMA receive filter coupled in parallel with a GSM receive filter for filtering an output of the common receive downconverter mixer, and a receive VGA selectively couplable to the CDMA receive filter and the GSM receive filter for amplifying an output of the CDMA receive filter and an output of the GSM receive filter.

6. A communication system as recited in claim 5, further including:
   a CDMA first LO frequency generator for generating the CDMA receive first LO frequency and the CDMA transmit first LO frequency, a GSM first LO frequency generator for generating the GSM receive first LO frequency and the GSM transmit first LO frequency, a receive second LO frequency generator for generating the receive second LO frequency, and a transmit second LO frequency generator for generating the transmit second LO frequency; and
   a receive first LO frequency power combiner coupled for receiving and combining the CDMA receive first LO frequency and the GSM receive first LO frequency to generate the receive first LO frequency.

7. A communication system as recited in claim 2, the receive first LO frequency comprising a CDMA receive first LO frequency and a GSM receive first LO frequency, the at least one downconverter comprising:
   a variable gain attenuator coupled for attenuating the at least one CDMA receive first information signal, a CDMA receive LNA coupled for amplifying an output of the variable gain attenuator, a CDMA receive image reject filter coupled for filtering an output of the CDMA receive LNA, a CDMA receive downconverter mixer coupled for receiving and mixing an output of the CDMA receive image reject filter and the CDMA receive first LO frequency, and a CDMA receive filter coupled for filtering an output of the CDMA receive downconverter mixer;
   a preselector filter coupled for filtering the at least one GSM receive first information signal, a GSM receive LNA coupled for amplifying an output of the preselector filter, a GSM receive image reject filter coupled for filtering the output of the GSM receive LNA, a GSM receive downconverter mixer coupled for receiving and mixing an output of the GSM receive image reject filter and the GSM receive first LO frequency, and a GSM receive filter coupled for filtering the output of the GSM receive downconverter mixer; and
   a receive VGA selectively couplable to the CDMA receive filter and the GSM receive filter for amplifying an output of the CDMA receive filter and an output of the GSM receive filter.

8. A communication system as recited in claim 7, further including:
   a CDMA first LO frequency generator for generating the CDMA receive first LO frequency and the CDMA transmit first LO frequency, a GSM first LO frequency generator for generating the GSM receive first LO frequency and the GSM transmit first LO frequency, a receive second LO frequency generator for generating the receive second LO frequency, and a transmit second LO frequency generator for generating the transmit second LO frequency.

9. A communication system as recited in claim 2, the receive first LO frequency comprising a CDMA receive first LO frequency and a GSM receive first LO frequency, the at least one downconverter comprising:
   a preselector filter coupled for filtering the at least one GSM receive first information signal, a common receive LNA selectively couplable for receiving and amplifying the at least one CDMA receive first information signal and an output of the preselector filter, a CDMA receive image reject filter and a GSM receive image reject filter selectively couplable to the common receive LNA for filtering an output of the common receive LNA; and
   a common receive downconverter mixer selectively couplable to the CDMA receive image reject filter and the GSM receive image reject filter for mixing an output of the CDMA receive image reject filter and an output of the GSM receive image reject filter with the receive first LO frequency, a CDMA receive filter coupled in parallel with a GSM receive filter for filtering an output of the common receive downconverter mixer, and a receive VGA selectively couplable to the CDMA receive filter and the GSM receive filter for amplifying an output of the CDMA receive filter and an output of the GSM receive filter.

10. A communication system as recited in claim 9, further including:
   a CDMA first LO frequency generator for generating the CDMA receive first LO frequency and the CDMA transmit first LO frequency, a GSM first LO frequency generator for generating the GSM receive first LO frequency and the GSM transmit first LO frequency, a receive second LO frequency generator for generating the receive second LO frequency, and a transmit second LO frequency generator for generating the transmit second LO frequency; and
   a receive first LO power combiner coupled for receiving and combining the CDMA receive first LO frequency and the GSM receive first LO frequency to generate the receive first LO frequency.

11. A process for communicating code division multiple access (CDMA) and global system for mobile communication (GSM) transmit and receive first information signals, comprising:
   modulating a transmit second LO frequency with a transmit baseband information signal to generate a transmit second information signal;
   variably amplifying the transmit second information signal to controllably normalize the transmit second information signal power levels for a plurality of CDMA cellular communication channels;

upconverting the transmit second information signal with a CDMA transmit first LO frequency to generate at least one CDMA transmit first information signal or upconverting the transmit second information signal within a translation loop with a GSM transmit first LO frequency to generate at least one GSM transmit first information signal;

transmitting the at least one CDMA transmit first information signal or the at least one GSM transmit first information signal through at least one antenna; and receiving at least one CDMA receive first information signal or at least one GSM receive first information signal from the at least one antenna, downconverting the at least one CDMA receive first information signal or the at least one GSM receive first information signal with a receive first LO frequency to generate a receive second information signal, and demodulating the receive second information signal with a receive second LO frequency to generate a receive baseband information signal.

12. A process as recited in claim 11, wherein the step of upconverting the transmit second information signal with a transmit first LO frequency to generate at least one CDMA transmit first information signal comprises mixing the transmit second information signal with the transmit first LO frequency, and wherein the step of upconverting the transmit second information signal with a transmit first LO frequency to generate at least one GSM transmit first information signal comprises translation loop filtering the transmit second information signal with the transmit first LO frequency.

13. A process as recited in claim 11, wherein the step of downconverting the at least one CDMA receive first information signal and the at least one GSM receive first information signal with a receive first LO frequency to generate a receive second information signal comprises the steps of:

amplifying the at least one CDMA receive first information signal and the at least one GSM receive first information signal;

filtering the at least one CDMA receive first information signal and the at least one GSM receive first information signal to remove image noise produced in the amplifying step;

mixing the at least one CDMA receive first information signal and the at least one GSM receive first information signal with the receive first LO frequency to produce the receive second information signal;

filtering the receive second information signal to remove spurious frequencies generated during the mixing step; and variably amplifying the receive second information signal.

14. A system for transmitting code division multiple access (CDMA) and global system for mobile communication (GSM) transmit first information signals, the system comprising:

at least one antenna for transmitting at least one CDMA transmit first information signal and at least one GSM transmit first information signal;

means coupled to the at least one antenna for modulating a transmit second LO frequency with a transmit baseband information signal to generate a transmit second information signal;

means for variably amplifying the transmit second information signal to controllably normalize the transmit second information signal power levels for a plurality of CDMA cellular communication channels;

means for upconverting the transmit second information signal with a transmit first LO frequency to generate the at least one CDMA transmit first information signal and means for upconverting the transmit second information signal within a translation loop using a GSM transmit first LO frequency to generate at least one GSM transmit first information signal; and means for communicating the at least one CDMA transmit first information signal and the at least one GSM transmit first information signal to the at least one antenna.

15. A system as recited in claim 14, wherein the means for upconverting the transmit second information signal with the transmit first LO frequency to generate the at least one CDMA transmit first information signal comprises means for mixing the transmit second information signal with the transmit first LO frequency, and wherein the means for upconverting the transmit second information signal with the transmit first LO frequency to generate the at least one GSM transmit first information signal comprises means for translation loop filtering the transmit second information signal with the transmit first LO frequency.

16. A system for receiving code division multiple access (CDMA) and global system for mobile communication (OSM) receive first information signals, the system comprising:

means for receiving at least one CDMA receive first information signal and at least one OSM receive first information signal;

means for downconverting the at least one CDMA receive first information signal and the at least one GSM receive first information signal with a receive first LO frequency to generate a receive second information signal;

means for van-ably attenuating the receive second information signal to normalize the receive second information signal power levels for a plurality of CDMA cellular communication channels; and means for demodulating the receiving second information signal with a receive second LO frequency to generate a receive baseband information signal.

17. The system as recited in claim 16, wherein the means for downconverting the at least one CDMA receive first information signal and the at least one GSM receive first information signal with the receive first LO frequency to generate the receive second information signal, comprises:

means for amplifying the at least one CDMA receive first information signal and the at least one GSM receive first information signal;

means for filtering the at least one CDMA receive first information signal and the at least one GSM receive first information signal to remove image noise produced in the amplifying step;

means for mixing the at least one CDMA receive first information signal and the at least one GSM receive first information signal with the receive first LO frequency to produce the receive second information signal; and means for filtering the receive second information signal to remove spurious frequencies generated during the mixing step.

* * * * *

UNITED STATES PATENT AND TRADEMARK OFFICE
CERTIFICATE OF CORRECTION

PATENT NO. : 6,584,090 B1
DATED : June 24, 2003
INVENTOR(S) : Abdelgany et al.

It is certified that error appears in the above-identified patent and that said Letters Patent is hereby corrected as shown below:

<u>Column 16,</u>
Line 4, after the word "a", delete the word "transit", and substitute therefor
-- transmit --.

<u>Column 20,</u>
Line 38, after the word "for", delete the word "van-ably", and
substitute therefor -- variably --.
Line 42, after the word "the", delete the word "receiving", and substitute
therefor -- receive --.

Signed and Sealed this

Twelfth Day of August, 2003

JAMES E. ROGAN
*Director of the United States Patent and Trademark Office*